United States Patent [19]

Madej

[11] 4,262,409

[45] Apr. 21, 1981

[54] CABLE CONNECTOR

[75] Inventor: Edward A. Madej, Verona, Pa.

[73] Assignee: Robroy Industries, Verona, Pa.

[21] Appl. No.: 899,503

[22] Filed: Apr. 24, 1978

[51] Int. Cl.³ .............................................. F16L 5/00
[52] U.S. Cl. .................................. 29/526 R; 248/56;
403/195; 403/197
[58] Field of Search ......... 248/56; 174/153 G, 152 G,
174/65 G; 339/103 R, 103 B, 103 C, 103 M, 126
RS; 24/25, 268, 136 L, 136 R, 263 SW, 263
DC, 115 M; 403/197, 195, 201; 285/162; 16/2;
29/526 R; 85/36

[56] References Cited

U.S. PATENT DOCUMENTS

| | | | |
|---|---|---|---|
| 346,784 | 8/1886 | Stanford | 24/263 DC |
| 482,975 | 9/1892 | Cope | 24/136 R |
| 1,394,071 | 10/1921 | Driscoll | 24/263 DC |
| 1,821,294 | 9/1931 | Dieter | 248/56 |
| 2,056,036 | 9/1936 | Catron et al. | 85/36 |
| 2,207,469 | 7/1940 | Roye | 24/263 DC X |
| 2,828,147 | 3/1958 | Peiffer | 248/56 X |
| 2,920,407 | 1/1960 | Stathem | 24/263 SW |
| 3,056,852 | 10/1962 | Sachs | 174/153 G |
| 3,123,662 | 3/1964 | Fink | 174/153 G X |
| 3,249,687 | 5/1966 | Klumpp | 174/153 G |
| 3,255,428 | 6/1966 | Robbins | 339/95 D |
| 3,290,430 | 12/1966 | Klumpp et al. | 174/153 G |
| 3,300,163 | 1/1967 | Randolph | 248/56 |
| 3,300,825 | 1/1967 | Andreason | 24/25 X |
| 3,384,393 | 5/1968 | Horton et al. | 285/158 |
| 3,493,205 | 2/1970 | Bromberg | 248/56 |
| 3,638,909 | 2/1972 | Dew | 24/263 SW X |
| 3,689,014 | 9/1972 | Fink | 248/56 |
| 3,728,470 | 4/1973 | Maier | 174/58 |
| 3,751,579 | 8/1973 | Nojiri | 174/153 G |
| 3,778,868 | 12/1973 | Kelly | 24/115 M |
| 3,788,582 | 1/1974 | Swanquist | 248/56 |
| 3,953,665 | 4/1976 | Nicholson | 174/153 G |
| 3,991,446 | 11/1976 | Mooney et al. | 174/153 G X |
| 4,002,822 | 1/1977 | Kurosaki | 174/153 G |
| 4,056,252 | 11/1977 | Simon | 248/56 |

FOREIGN PATENT DOCUMENTS 670795 1/1966 Belgium ................................ 24/136 L
623460 12/1935 Fed. Rep. of Germany ....... 339/103 C

OTHER PUBLICATIONS

"The Electrical Distributor", p. 89, Mar. 1977, Blackhawk Industries Advertisement for Bush—Grip.

Primary Examiner—Rodney H. Bonck
Attorney, Agent, or Firm—Stanley J. Price, Jr.; John M. Adams

[57] ABSTRACT

A cable connector includes an insert having a tubular body portion with a conical end portion longitudinally spaced from an annular flanged end portion by diametrically opposed radial grooves. The insert is positioned in an aperture extending through a wall of an electrical junction box. The tubular body portion is contractable to permit the wall surrounding the aperture to be positioned in surrounding relation with the grooves to retain the tubular body portion in the aperture. A passageway extends through the tubular body portion and includes a rectangular inlet and a rectangular outlet. Vertical sidewalls of the passageway diverge outwardly from the inlet to the outlet so that the cross sectional area of the outlet is greater than the cross sectional area of the inlet. A pair of wedge shaped members are positioned in the passageway to secure a cable, such as an insulated conductor, extending through the passageway from being pulled out of the junction box. As the cable is moved in an axial direction through the insert from the inlet to the outlet of the passageway, the cable passes between the wedge-shaped members and urges the wedge-shaped members outwardly into abutting relation with the inclined sidewalls of the insert. Movement of the cable out of the insert is prevented by the wedging engagement of the wedge-shaped members between the cable and the insert inclined sidewalls.

17 Claims, 8 Drawing Figures

U.S. Patent     Apr. 21, 1981     4,262,409
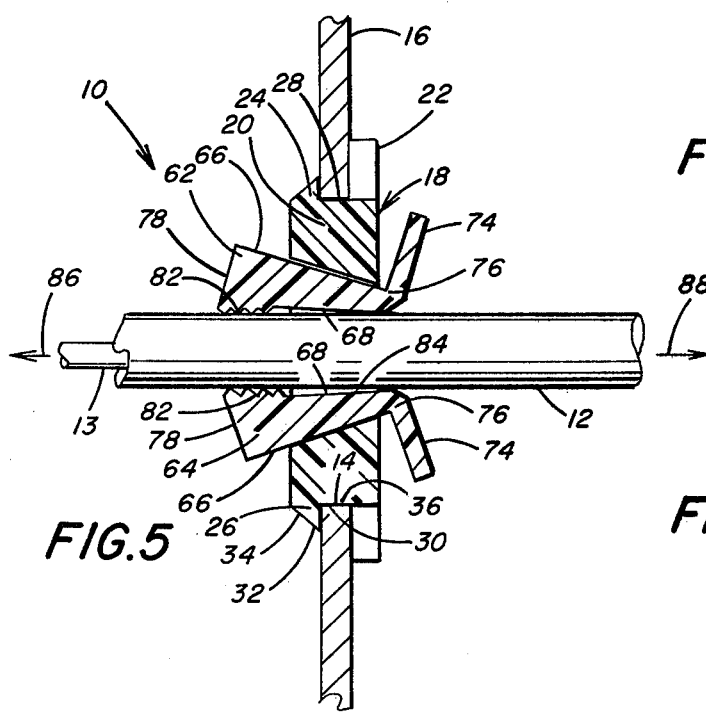
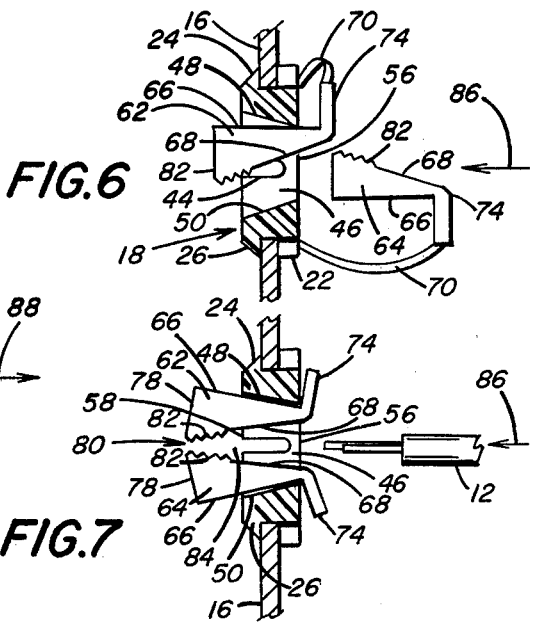
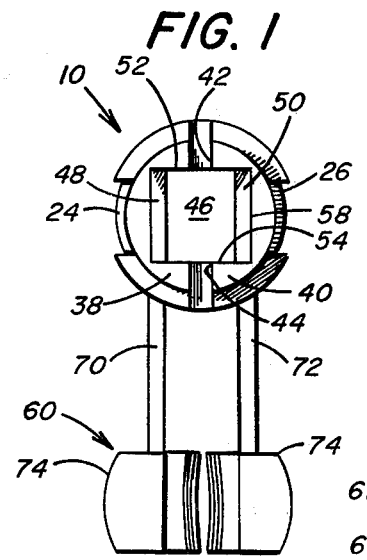
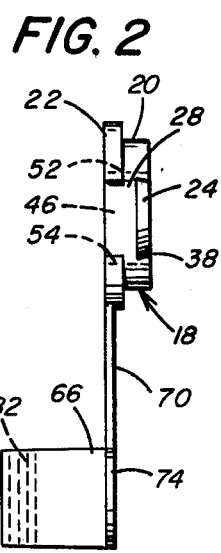
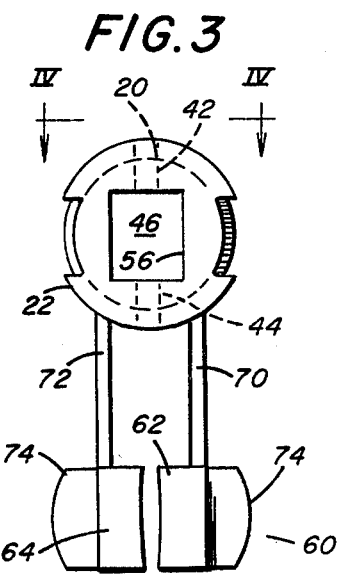
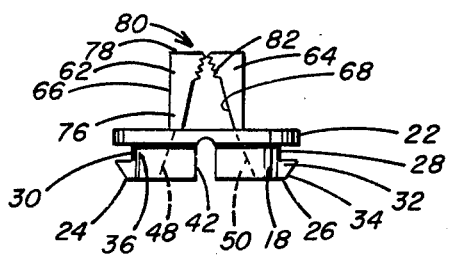
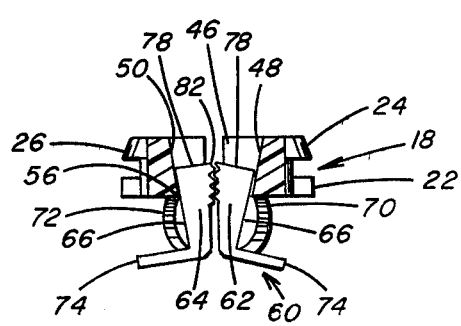

CABLE CONNECTOR

BACKGROUND OF THE INVENTION

1. Field of the Invention

This invention relates to a connector for securing a member in an aperture of a supporting structure and more particularly to a connector for connecting a partially deformable member to a supporting structure in a manner to permit movement of the member in a first direction through the aperture of the supporting structure, but prevent movement of the member in a second direction through the aperture.

2. Description of the Prior Art P Non-metallic sheathed cable and flexible cord connectors are known for securing a sheathed electric cable to a junction box where the cable enters the junction box through a knock-out opening in the wall of the junction box. The primary function of the connector is to retain the cable in the junction box in a manner to prevent damage to the outer flexible sheathing or insulation surrounding the electric conductors by engagement of the connector with the cable. In addition, the connector is fabricated of a nonconductive material and serves to insulate the cable from the junction box.

U.S. Pat. NO. 3,056,852 discloses a strain-relief grommet for securing an electrical conductor passing through a knock-out opening of an electrical box to the wall of the electrical box. A pair of sections have mating tapered surfaces where one section passes through an aperture of the wall of the electrical box and is axially fixed thereto. The second section is axially movable into the passageway of the first section. The conductor extends through the first section and camming surfaces of the two sections prevent removal of the conductor from the wall of the electrical box. The section secured to the wall of the electrical box has a recessed portion with an enlarged shoulder to secure the section in the aperture of the wall.

The following patents are directed to other types of electrical connectors and grommets having the described specific features. U.S. Pat. No. 3,728,470 discloses an outlet box configuration. U.S. Pat. No. 3,384,393 discloses a yoke-shaped wedge. U.S. Pat. No. 3,300,163 discloses a gripping member of tubular shape. U.S. Pat. No. 3,290,430 discloses a bushing having two parts plus a tongue member. U.S. Pat. No. 3,249,687 is directed to a pair of shank sections forming a bushing. U.S. Pat. No. 3,991,446 is directed to a core portion having a plurality of arms extending therefrom. U.S. Pat. No. 3,953,665 discloses blade-like members with locking means provided thereon. U.S. Pat. No. 3,751,579 is directed to a plug member that is secured to a portion of a bushing body not engaged to the wall of the junction box. U.S. Pat. No. 3,493,205 is directed to a bushing with body portions and a plug in one body portion to engage a conduit.

U.S. Pat. No. 3,689,014 is directed to a bushing outer shank portion having at least two sections and a channel through a shank portion that is recessed to receive a grip block. U.S. Pat. No. 3,788,582 is directed to a cam member journaled in a body cross-wise of the passageway of the body. U.S. Pat. No. 4,002,822 is directed to protrusions in grooves on the halves of a grommet.

There is need to provide a non-metallic connector for securing a flexible cable or the like in the knock-out opening of a junction box so as to permit movement of the cable into the junction box, but prevent the cable from being pulled out of the junction box in a manner which prevents damaging the exterior surface of the cable.

SUMMARY OF THE INVENTION

In accordance with the present invention there is provided a connector for securing a member in an aperture of a supporting structure. An insert is adapted for positioning in the aperture for releasable engagement with the supporting structure. The insert has a body portion with a passageway therethrough. The passageway has at least one inclined wall. An engaging device is adapted to be positioned in the passageway for engaging the member with the insert to thereby secure the member in the aperture of the supporting structure. The engaging device has a first surface and a second surface. The engaging device first surface is arranged to abut the inclined wall of the passageway. The engaging device second surface is adapted to engage the member in the passageway of the insert so that the engaging device becomes wedged between the inclined wall of the insert passageway and the member to permit movement of the member in a first direction in the passageway and to restrain movement of the member in a second direction in the passageway.

Preferably, the body portion of the insert has a tubular configuration with an annular flange positioned at one end of the tubular body portion. The tubular body portion includes a pair of segments through which the passageway extends. The segments are separated from one another by longitudinally extending slots that extend through top and bottom walls of the passageway. With this arrangement the tubular body portion is contractable upon insertion within the aperture of the supporting structure. In one embodiment of the present invention the insert may be positioned in a knock-out opening of a wall of an electrical junction box. The insert secures a member, such as an insulated electric cable to the junction box in a manner to permit movement of the electric cable through the knock-out opening into the box, but prevent the electric cable from being pulled out of the box.

A groove arrangement is provided on each segment of the tubular body portion and extends from adjacent the annular flange longitudinally to a radial portion that extends outwardly from each segment of the tubular body portion. The radial portions are positioned oppositely of one another on each segment and each has a conical surface that extends at an acute angle from one end of the tubular body portion toward the annular flange terminating in a shoulder that extends upwardly from the radial groove in each segment. The groove serves as a seat for receiving the portion of the supporting structure surrounding the aperture thereof.

Preferably, the passageway for receiving the engaging means is formed by a pair of oppositely positioned inclined walls that diverge outwardly in the first direction through the passageway and a pair of parallel positioned walls to form an aperture having an inlet and an outlet. The cross sectional area of the outlet is greater than the cross sectional area of the inlet. With this arrangement the engaging device which includes a pair of wedge-shaped members is arranged for axial movement from the inlet of the aperture to the outlet of the aperture.

Each wedge-shaped member has a first surface movable into frictional engagement with the inclined wall of the passageway and a second surface arranged to move into wedging engagement with the member. The second surfaces are inclined to the longitudinal axis of the wedge-shaped members and are spaced oppositely of one another to form an opening for receiving the member. The opening tapers inwardly along the first direction in the passageway so that the cross sectional area of the opening between the inclined surfaces decreases in an axial direction toward the outlet of the insert.

Preferably, at the end of the wedge-shaped members on the inclined surfaces are provided a plurality of projections which are operable to move into engagement with the member as the first surfaces of the wedge-shaped members move on the inclined walls of the insert. As the member moves through the opening provided between the wedge-shaped members in the first direction through the insert, the first surfaces of the wedge-shaped members move laterally away from one another along the surface of the outwardly diverging inclined walls. This permits the member to pass freely in one direction through the insert which is particularly advantageous for securing an electric cable to the wall of an electrical junction box.

With the member extending between the wedge-shaped members and through the insert, movement of the member in a second direction from the outlet to the inlet of the insert urges the wedge-shaped members to move in the second direction. Movement of the member in the second direction urges the wedge-shaped members to move outwardly so that the first surfaces thereof contact the inclined walls of the insert. The first surfaces continue to move relative to the inclined walls until the member wedges the first surfaces of the wedge-shaped members into frictional engagement with the inclined walls of the insert. The wedge-shaped members move in the second direction through the insert until the cross sectional area of the aperture surrounding the wedge-shaped members is insufficient to permit the wedge-shaped members and the member to move in the second direction. In this manner the member is prevented from being removed from connection with the supporting structure.

Further, in accordance with the present invention there is provided a method for securing a member in an aperture of a supporting structure that includes releasably engaging a connector in the aperture of the supporting structure. An engaging device is positioned in a passageway of the connector. The member is inserted in the passageway to position the engaging device between the connector and the member. By exerting a force upon the member, the engaging device is moved longitudinally in the passageway in a direction opposite to the direction of insertion of the member in the passageway to wedge the engaging device between the connector and the member and thereby secure the member in the aperture of the supporting structure.

Accordingly, the principal object of the present invention is to provide a connector for connecting the member to a supporting structure in a manner to permit the member to advance in a first direction through an aperture in the supporting structure and restrain movement of the member in a second direction out of the aperture of the supporting structure.

Another object of the present invention is to provide a non-metallic cable connector that is operable for releasable engagement in the aperture of an electrical junction box and to anchor an electrically insulated conductor in the junction box to prevent removal of the insulated conductor from the junction box.

A further object of the present invention is to provide a non-metallic insert arranged to releasably engage the wall of an electrical junction box surrounding a knock-out opening and a pair of wedge-shaped members that are inserted in the insert to wedge an insulated electric cable within the passageway of the insert in a manner to permit movement of the cable into the junction box but prevent withdrawal of the cable from the junction box.

These and other objects of the present invention will be more completely disclosed and described in the following specification, the accompanying drawings and the appended claims.

BRIEF DESCRIPTION OF THE DRAWINGS

FIG. 1 is a front end view of a non-metallic connector of the present invention, illustrating an insert for positioning in an aperture of a wall with a passageway having a tapered configuration passing through the insert and a pair of wedge-shaped members flexibly secured to the insert and arranged to be positioned in the passageway of the insert.

FIG. 2 is a view in side elevation of the connector illustrating the wedge-shaped members flexibly secured to the body of the insert.

FIG. 3 is a rear end view of the connector, illustrating the inlet of the passageway having a reduced cross sectional area for receiving the wedge-shaped members.

FIG. 4 is a top plan view of the connector taken along line 4—4 of FIG. 3, illustrating the outwardly diverging inclined sidewalls of the insert passageway and the configuration of the wedge-shaped members.

FIG. 5 is a top plan view partially in section, illustrating the insert releasably engaged in an aperture of a wall and the wedge-shaped members positioned in gripping engagement with the cable.

FIG. 6 is a top plan view, partially in section, of the connector positioned in the aperture of a wall, illustrating the positioning of the wedge-shaped members within the insert prior to positioning of the cable in the insert.

FIG. 7 is a view similar to FIG. 6, illustrating the wedge-shaped members positioned in the insert with tab portions pressed against the insert so as to provide an opening for the cable to advance in a first direction through the insert and between the wedge-shaped members.

FIG. 8 is a top plan view partially in section of the connector, illustrating the wedge-shaped members retained in a relaxed position in the insert when the cable is removed.

DESCRIPTION OF THE PREFERRED EMBODIMENT

Referring to the drawings and particularly to FIGS. 1–5 there is illustrated a connector generally designated by the numeral 10 for securing a member, such as a sheathed electric cable 12 with one or more electrical conductors 13 therein, in an aperture 14 or knock-out opening formed in a supporting structure or wall 16, for example, of a metallic junction box. The connector 10 includes an insert portion generally designated by the numeral 18 which is adaptable for mounting in the aperture 14 of the wall 16 in a manner to permit releasable engagement of the connector 10 with the wall 16. The insert portion 18 includes a tubular body portion 20 having at one end thereof an annular flange 22 and a pair of radial segments 24 and 26 at the opposite end.

The radial segments 24 and 26 are diametrically opposed on the outer surface of the tubular body portion 20 and are longitudinally spaced from the annular flange 22 by grooves 28 and 30. Each groove 28 and 30 is defined by the oppositely positioned surfaces of the annular flange 22 and the respective radial segments 24 and 26 and a radial shoulder 36 extending between the surfaces of the annular flange and radial segments. The grooves 28 and 30 have a preselected length on the outer periphery of the insert tubular body portion 20. The grooves 28 and 30 have a preselected depth for receiving the portion of the wall 16 surrounding the aperture 14 in a manner to be explained later in greater detail.

Each of the radial segments 24 and 26 has a conical surface 34 that extends at an acute angle from one end of the tubular body portion 20 toward the annular flange 22. The conical surface 34 terminates in a shoulder 32 that extends upwardly from the respective grooves 28 and 30. With this arrangement the radial segments 24 and 26 form a seat with the grooves 28 and 30 for receiving the wall portion of the box surrounding the aperture 14.

As illustrated in the drawings, the tubular body portion 20 extends axially from the annular flange 22 and is formed by a pair of semicircular segments 38 and 40 which are vertically spaced from one another by upper and lower slots 42 and 44. The slots 42 and 44 extend longitudinally the length of the tubular body portion 20 and extend a preselected depth into the annular flange 22. With this arrangement the semicircular segments 38 and 40 are laterally contractable to move toward and away from each other so as to facilitate positioning of the insert portion 18 in the aperture 14 of the wall 16.

To mount the insert portion 18 in the wall aperture 14, the end of the tubular body portion 20 adjacent the radial segments 24 and 26 is advanced axially into the aperture 14. As the tubular body portion 20 is advanced into the aperture 14, the conical surfaces 34 of the segments 24 and 26 are urged into contact with the portion of the wall 16 surrounding the aperture 14. The contractable nature of the semicircular segments 38 and 40 permits the segments to be urged toward one another by the inward compressive forces exerted upon the segments 38 and 40 as the conical surfaces 34 move axially through the aperture 14 in contact with the wall 16. With this arrangement the insert portion 18 is installed without the need for tools. Similarly, the contractable nature of the segments 38 and 40 facilitate efficient removal of the insert portion 18 from the wall 16 to permit the connector 10 to be used in another installation.

Movement of the conical surfaces 34 into the aperture 14 compresses the segments 38 and 40 to permit the tubular body portion 20 of the insert portion 18 to pass through the aperture 14. Once the conical surfaces 34 have passed through the aperture and are released from contact with the wall, the compressive forces upon the surfaces 34 are released permitting the segments 38 and 40 to spring outwardly so that the inner circular edge of the wall 16 about the aperture 14 moves into the grooves 28 and 30 into abutting relation with the shoulders 36. In this position the insert portion 18 is retained in the aperture 14 and restrained from removal therefrom by engagement of the circular edge of the wall 16 about the aperture 14.

Referring to FIGS. 1 and 3, a passageway 46 extends axially through the annular flange 22 and the tubular body portion 20. The passageway 46 is formed by a first pair of oppositely positioned inclined walls 48 and 50 and a second pair of parallel positioned walls 52 and 54. For purposes of illustration and better understanding of the invention, the walls 48 and 50 shall be referred to as sidewalls and the walls 52 and 54 as top and bottom walls, respectively. However, it should be understood that the walls 48, 50, 52 and 54 are not restricted to the descriptions of side, top and bottom walls.

The passageway 46 thus formed has an inlet 56 and an outlet 58 which inlet and outlet has a rectangular configuration as formed by the joining walls 48–54. However, the inlet 56 and outlet 58 may have any other suitable configuration and preselected dimensions as determined by the cross sectional area of the cable 12. The sidewalls 48 and 50 are inclined or diverged laterally outwardly in an axial direction from the inlet 56 to the outlet 58. Thus the outlet 58 has a cross sectional area which is greater than the inlet 56. Accordingly, the cross sectional area of the passageway 46 progressively increases from the inlet 56 to the outlet 58.

An engaging device generally designated by the numeral 60 is adapted to be positioned in the passageway 46 for engaging the insulated electric cable 12 to the insert portion 18 and thereby connect the cable 12 to the electrical box and prevent removal of the cable from the electrical box. The engaging device includes a pair of wedge-shaped members 62 and 64 that are arranged for axial movement in the passageway 46 and are introduced into the passageway 46 from the inlet 56 thereof. Each wedge-shaped member 62 and 64 includes a flat surface 66 that is movable in the passageway 46 opposite the respective inclined sidewalls 48 and 50 and an inclined surface 68 movable into contact with the surface of the cable 12. The flat surfaces 66 are operable to move into frictional engagement with the inclined sidewalls 48 and 50 and the inclined surfaces 68 are arranged to move into wedging or gripping engagement with the cable 12.

Preferably, the wedge-shaped members 62 and 64 are connected to the insert portion 18 and particularly to the annular flange 22 for purposes of convenience of use by stringers 70 and 72 respectively. Each stringer is connected in the forming process, such as by injection molding which is known in the art, at one end to the annular flange 22 and at the opposite end to a tab portion 74 of each wedge-shaped member 62 and 64. The tab portion 74 extends laterally from the end portion 76. The opposite end portion 78 of each wedge-shaped member has a vertical face and extends at an acute angle to the inclined surface 68 and perpendicular to the flat surface 66.

Preferably, the connector 10 is fabricated of a polymeric resin material, such as polypropylene or any other suitable material having a dielectric constant that permits the material to insulate the cable 12 from the wall 16 of a metallic junction box. Also portions of the connector 10 may be fabricated from various metals or any other suitable material when insulating properties are not required.

Adjacent the end portion 78 of each member 62 and 64 on the inclined surface 68 is a gripping surface 80 formed by a plurality of parallel spaced protrusions or projections 82. The protrusions 82 form parallel rows of teeth that extend at an angle of approximately 45° a preselected height from the inclined surface 68 of each wedge-shaped member 62 and 64. The protrusions are sized to prevent cutting of the partially deformable coating or sheathing of the cable 12. To this end the height of the protrusions is less than the thickness of the coating around the conductor 13. When the wedge-shaped members 62 and 64 are inserted in the insert passageway 46, the tab portions 74 serve as stop members to prevent the members 62 and 64 from completely passing through the passageway 46. The stringers 70 and 72 resiliently retain the members 62 and 64 in the passageway 46.

As illustrated in FIG. 7, when the wedge-shaped members 62 and 64 are positioned in the passageway 46 and the tab portions 74 are pressed into engagement with the end wall of the insert portion 18, the engaging portions 80 are positioned oppositely of one another and due to the wedge-shaped configuration of the members 62 and 64 a tapered opening 84 is formed between the members 62 and 64. The opening 84 is arranged to receive the cable 12 and tapers inwardly from a maximum lateral dimension adjacent the passageway inlet 56 to a minimum lateral dimension adjacent the passageway outlet 58. Thus while the cross sectional area of the passageway 46 of the tubular body portion 20 progressively increases in an axial direction indicated by the arrow 86; the opening 84 provided by the wedge-shaped members 62 and 64 progressively decreases in cross sectional area in the axial direction of arrow 86.

As illustrated in FIG. 8, when the cable 12 is removed from the insert portion 18 and the members 62 and 64 are positioned in a relaxed position in the passageway 46, the spring action of the stringers 70 and 72 pulls the members 62 and 64 together. Thus the members are retained in the passageway 46 because the total width of the members 62 and 64 when they are in abutting relation is greater than the width of the passageway 46 at the inlet 56. This arrangement facilitates efficient installation of the cable 12 in the insert 18.

As illustrated in FIGS. 6 and 7, the wedge-shaped members 62 and 64 are initially advanced in the direction of arrow 86 into the passageway 46 through the inlet 56 thereof. Due to the outwardly diverging configuration of the passageway 46, the members 62 and 64 are movable axially within the passageway 46. As illustrated in FIG. 7, when a force is applied to the tab portions 74 to urge the tab portions 74 toward the outer surface of the insert 18, the flat surfaces 66 of the members 62 and 64 are advanced along the inclined sidewalls 48 and 50. As the members 62 and 64 move in the direction of arrow 86 through the passageway 46 along the inclined sidewalls 48 and 50, the distance between the members 62 and 64 increases. In this manner the lateral distance between the end portions 78 of the members 62 and 64 is increased so that the protrusions 82 on one member move away from the protrusions 82 on the other member. Thus the cable 12 may be released from the connector 10 by conveniently pressing on the tab portions 74 to advance the members 62 and 64 in the passageway 46 as illustrated in FIG. 7 and then by pulling the cable 12 in the direction of arrow 88.

As the cable is advanced in an axial direction of arrow 86 into the insert 18 and the tapered opening 84, the cable 12 is freely movable through the inlet 46 into the expanded portion of opening 84. As the cable 12 passes between the projections 82, the members 62 and 64 are urged laterally outwardly away from one another and toward the inclined sidewalls 48 and 50. This permits the cable 12 to move freely without obstruction in the axial direction 86 through the insert 18 into the electrical box. The positioning of the cable 12 between the members 62 and 64 urges the members into abutting relation with the tubular body portion about the passageway 46. Thus the flat surfaces 66 move into abutting relation with the inclined sidewalls 48 and 50.

As the surfaces 66 move into abutting relation with the inclined sidewalls 48 and 50, the members 62 and 64 are moved laterally to provide increased clearance at the end portions 78 for passage of the cable 12 between the wedge-shaped members 62 and 64. As long as the cable 12 is advanced in the axial direction 86 through the insert 18, a sufficient lateral dimension is provided by the tapered configuration of the passageway 46 to permit the wedge-shaped members to expand outwardly and provide an opening of sufficient width between the projections 82 to permit the conductor to pass freely therebetween.

Even though the projections 82 engage the outer insulation of the cable 12 and the surfaces 66 abut the sidewalls 48 and 50, the cable passes freely in the direction of arrow 86 through the insert 18. However, movement of the cable 12 in an axial direction indicated by arrow 88 in FIG. 5 is restrained by the increasing gripping engagement of the projections 82 with the insulated cover of the cable 12 as the surfaces 66 of the members 62 and 64 move along the inclined sidewalls of 48 and 50. As the expanded portion of each of the members 62 and 64 moves into contact with the sidewalls 48 and 50, the projections 82 are urged into increasing gripping engagement with the cable 12.

Movement of the members 62 and 64 in the direction of arrow 88 causes the inclined sidewalls 48 and 50 to urge the members 62 and 64 toward each other. This urges the projections 82 into a greater engagement with the insulation of the cable 12. As the axial force exerted on the cable 12 in the direction of arrow 88 increases, the members 62 and 64 are compressed by the inclined sidewalls of the tubular body portion 20 to increase the engagement of the wedge-shaped members 62 and 64 with the cable 12. Consequently the cable 12 is prevented from being moved in the direction of arrow 88 and pulled out of the insert 18 and the aperture 14 of the wall 16.

Further, in accordance with the practice of the present invention, the cable 12 may be efficiently removed from insert 18 and accordingly the aperture 14 of the wall 16 by exerting pressure upon the tab portions 74 to move the members 62 and 64 toward the passageway outlet 58 and the tab portions 74 toward the surface of insert portion 18. When the tab portions 74 are depressed to the position illustrated in FIG. 7, the members 62 and 64 move on the inclined sidewalls 48 and 50 out of gripping engagement with the cable 12. By exerting a pulling force upon the cable 12 away from the insert portion 18 in the direction of arrow 88 in FIG. 5, the cable 12 is removed from the insert portion 18 and the aperture 14 of the wall 16.

It will also be apparent from the present invention that while the engaging device 60 is disclosed as including a pair of wedge-shaped members 62 and 64, it should also be understood that a single wedge-shaped member may be utilized to securely engage the cable 12 to the insert 18 in the aperture 14 of the wall 16. This embodiment is also operable to permit the cable 12 to be freely moved in an axial direction through the insert 18 and the aperture 14 into the electrical box, but restrain the cable from being pulled from the insert 18 out of the aperture 14 and the wall 16. It will be further apparent from the present invention that the non-metallic connector 10 is operable to facilitate rapid and efficient installation of an electric cable to an electrical junction box where the cable is freely movable in one direction to permit its installation in the box, but restrained from being pulled in the opposite direction out of the box. Furthermore, the engagement of the connector 10 with the cable 12 does not damage the cable or deform or cut the insulation material surrounding the cable.

According to the provision of the Patent Statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A method for releasably securing a member in an aperture of a supporting structure comprising, releasably engaging a connector in the aperture of the supporting structure, positioning an engaging device in a passageway of the connector, retaining the engaging device in an operative position in the passageway of the connector to receive the member, inserting the member through the aperture of the supporting structure and through the passageway of the connector after the engaging device is operatively positioned in the passageway, positioning the member in abutting relation with the engaging device so that the engaging device is between the connector and the member in the passageway, exerting a force upon the member to move the engaging device longitudinally in the passageway in a direction being opposite to the direction of insertion of the member in the passageway to a first position to wedge the engaging device between the connector and the member and thereby secure the member in the aperture of the supporting structure, exerting a force upon the member to move the engaging device longitudinally in the passageway in the direction of insertion of the member in the passageway to a second position permitting the member to pass freely in the aperture of the supporting structure, and connecting the engaging device to the connector by a flexible resilient means, extending the flexible resilient means between the engaging means and the connector, and releasably retaining the engaging means by the flexible resilient means in an operative position in the passageway of the connector in the absence of the member in the passageway to thereby permit insertion of the member in the passageway with the engaging means positioned in the passageway.

2. A method for releasably securing a member in an aperture of a supporting structure as set forth in claim 1 which includes, positioning the engaging device in the passageway of the connector with a flange portion of the engaging device extending out of the passageway and spaced from the surface of the connector, advancing the member in a first direction toward the flange portion to move the member through the aperture of the supporting structure, depressing the flange portion toward the surface of the connector to release the member from wedging relation with the engaging device, and advancing the member in a second direction away from the flange portion to thereby remove the member from the aperture of the supporting structure.

3. A method for releasably securing a member in an aperture of a supporting structure as set forth in claim 1 which includes, resiliently retaining the engaging device in an operative position in the passageway, removing the engaging device from wedging engagement with the member while retaining the engaging device in the passageway, moving the member freely in the passageway of the connector in a first direction with the engaging device remaining positioned in the passageway, moving the member freely in the passageway of the connector in a second direction with the engaging device remaining in the passageway to remove the member from the passageway, and thereafter maintaining the engaging device in a relaxed position in the passageway with the member being removed therefrom.

4. A method for releasably securing a member in an aperture of a supporting structure as set forth in claim 1 which includes, connecting the engaging device to the connector by a flexible means, flexing the flexible means to position the engaging device in the passageway of the connector prior to insertion of the member through the connector, removing the member from the passageway while retaining the engaging device therein, and thereafter exerting a force upon the engaging device by flexing of the flexible means to maintain the engaging device in the passageway.

5. A method for releasably securing a member in an aperture of a supporting structure as set forth in claim 1 which includes, contracting the body of the connector to position the connector in the aperture of the supporting structure, expanding the body of the connector to retain the connector in the aperture of the supporting structure, and contracting the connector to thereby release the connector from engagement with the supporting structure.

6. A connector for securing a member in an aperture of a supporting structure comprising, a unitary insert adapted for positioning in the aperture for releasable engagement with the supporting structure, said unitary insert having a deformable, unitary body portion with a passageway therethrough, said passageway having an inlet and an outlet with at least one inclined wall extending from said inlet to said outlet to form said passageway with a tapered configuration so that the cross sectional area of said passageway increases from said inlet to said outlet, said deformable, unitary body portion having expansion and contraction means for releasably positioning said unitary insert in the aperture, engaging means movably retained in said passageway for engaging the member with said unitary insert to thereby secure the member in the aperture of the supporting structure, said engaging means being positioned in said passageway of said unitary insert to receive the member for movement through the aperture of the supporting structure, means for retaining said engaging means within said passageway of said unitary insert when said unitary insert is positioned in the supporting structure and the member is removed from said passageway, said means for retaining includes flexible resilient means for connecting said engaging means to said unitary insert, said flexible resilient means extending between said engaging means and said unitary insert, said flexible resilient means being operable to releasably retain said engaging means in an operative position in said passageway in the absence of the member in said passageway to thereby permit insertion of the member in said unitary insert passageway with said engaging means positioned in said unitary insert passageway, said engaging means having a first surface and a second surface, said engaging means first surface arranged to abut said inclined wall of said passageway, said engaging means second surface being adapted to engage the member in said passageway of said unitary insert so that said engaging means becomes wedged between said inclined wall of said unitary insert passageway, said tapered configuration of said passageway being arranged to permit said engaging means to move in a direction in said passageway from said inlet to said outlet so that the member is movable in a first direction in said passageway and the supporting structure, and said engaging means being restrained from movement in said passageway from said outlet to said inlet to restrain the member from moving in a second direction in said passageway and the supporting structure.

7. A connector as set forth in claim 1 in which, said first surface is parallel to the longitudinal axis of said engaging means and said second surface is inclined at an angle from the longitudinal axis of said engaging means, said second surface having gripping portions positioned in said passageway for forming an opening for receiving the member in said unitary insert, said gripping portions being movable axially in said passageway into gripping engagement with the member extending through said opening, and said engaging means first surface being urged laterally into wedging engagement with said inclined wall of said passageway as said gripping portions engage the member to prevent withdrawal of the member out of said unitary insert and the wall.

8. A connector as set forth in claim 1 which includes, said engaging means having an enlarged first end portion operable to prevent said engaging means from passing axially entirely through said passageway of said unitary insert, said engaging means having a wedge-shaped second end portion formed by said first and second surfaces with gripping portions projecting outwardly from said second surface adjacent to said second end portion, said gripping portions adapted to be positioned in parallel relation with the member, and said engaging means first surface adapted to abut said inclined wall of said passageway so that the member is movable in said first direction in said passageway and is restrained from movement in said second direction in said passageway.

9. A connector as set forth in claim 6 which includes, said passageway of said unitary insert having a second inclined wall positioned oppositely of said first mentioned inclined wall to thereby form a pair of oppositely positioned inclined walls.

10. A connector as set forth in claim 1 in which, said engaging means includes a first wedge-shaped member and a second wedge-shaped member, each of said wedge-shaped members including said first surface and said second surface, and said first surface extending parallel to the longitudinal axis of said respective wedge-shaped member and said second surface extending at an angle from the longitudinal axis of said respective wedge-shaped member.

11. A connector as set forth in claim 10 which includes, said passageway of said unitary insert having a second inclined wall positioned oppositely of said first mentioned inclined wall, said first and second wedge-shaped members being adapted to be positioned in spaced relation in said passageway with said first surfaces positioned oppositely of said passageway inclined walls and said second surfaces positioned oppositely of one another to form a longitudinal opening between said wedge-shaped members in said passageway, and said opening having a tapered configuration decreasing in cross sectional area in an axial direction from said inlet to said outlet of said passageway.

12. A connector as set forth in claim 11 which includes, said first surfaces of said wedge-shaped members being operable in response to movement of the member in said opening from said outlet to said inlet of said passageway to move into wedging engagement with said first and second inclined walls of said passageway and to urge said second surfaces of said wedge-shaped members into gripping engagement with the member to prevent withdrawal of the member out of said unitary insert and disengagement with the supporting structure.

13. A connector as set forth in claim 6 in which said engaging means includes, a pair of wedge-shaped members axially movable in said passageway of said unitary insert, said wedge-shaped members each having a first surface and a second surface, said second surface having a plurality of protrusions projecting inwardly within said passageway, and said protrusions forming a gripping surface adapted to securely engage the member when said wedge-shaped members are positioned in said passageway.

14. A connector as set forth in claim 6 in which said engaging means includes, a pair of wedge-shaped members positioned for axial movement in said passageway of said unitary insert, said wedge-shaped members each having a first end portion and a second end portion, said first end portion having a stop member for preventing said respective wedge-shaped member from passing entirely through said passageway, said second end portion having a transverse dimension greater than the transverse dimension of said first end portion thereby forming an inclined surface extending at an acute angle from said first end portion to said second end portion, a plurality of parallel positioned projections forming rows of teeth on said inclined surfaces of said wedge-shaped members adjacent the second end portions thereof, and said rows of teeth arranged to move into increasing gripping engagement with the member in response to axial movement of the member in said second direction in said passageway to prevent removal of the member from said passageway and the supporting structure.

15. A connector as set forth in claim 1 which includes, said passageway inlet being rectangularly shaped, said passageway outlet being rectangularly shaped, and a second inclined wall positioned oppositely of said first mentioned inclined wall.

16. A connector as set forth in claim 6 which includes, longitudinal slots in said deformable, unitary body portion of said unitary insert, and said slots extending through said unitary insert surrounding said passageway to thereby permit contraction of said expansion and contraction means of said deformable, unitary body portion for moving said insert in and out of the aperture of the supporting structure.

17. A connector as set forth in claim 6 which includes, said engaging means having a flanged end portion arranged to extend out of said passageway, said flanged end portion being positioned in spaced relation to said unitary insert when said engaging means is wedged between said inclined sidewall and the member, and said flanged end portion being movable toward said unitary insert to release said engaging means from wedging engagement with the member to permit movement of the member in said second direction in said passageway and release of the member from the supporting structure.

* * * * *